3,574,854
METHOD FOR SOOTHING THE SKIN WITH A CREAM CONTAINING SODIUM CHLORIDE
Francois J. Bossard, 33 Boulevard Malesherbes, Paris, France
No Drawing. Filed Mar. 20, 1967, Ser. No. 624,183
Claims priority, application France, Mar. 22, 1966, 54,428
Int. Cl. A61k 71/00
U.S. Cl. 424—357
1 Claim

ABSTRACT OF THE DISCLOSURE

A process for soothing the skin with a cosmetic consisting of a paste or cream comprising a hypertonic aqueous solution of sodium chloride in a colloidal silica carrier.

---

This invention relates to a process for soothing the skin with a cosmetic. The cosmetic consists essentially of a paste or cream in which the active element is a concentrated solution of sodium chloride in a colloidal silica carrier.

The sodium chloride is preferably used in the form of marine salt such as exists in commerce under the common name of kitchen salt. In this form sodium chloride is found to be accompanied by the salts of potassium, magnesium, calcium, and other elements whose action is favorable because, apart from its concentration, a solution of this marine salt reproduces essentially the composition of blood serum.

The solution is prepared by dissolving the salt in distilled or deionized water, which has been obtained through passage of ion exchangers. A solution is obtained with a concentration close to the saturation point or at least 15% higher than the concentration of sodium chloride in the blood. In other words, the salt solution is hypertonic.

The absorbent medium in which the solution of sodium chloride or marine salt is incorporated is silicon dioxide or silica in its colloidal form. Colloidal silica obtained in its gaseous phase and extremely fine grained and known under the name Aerosil is particularly appropriate for the preparation of this medicament. It retains the solution in stable and permanent form and releases the active element based on the sodium chloride only at the time of the application on the skin. The relative proportion of silica to be used is determined by the desired consistency. This varies from 3% for a rather liquid cream to 9% for a stiffer cream.

A paste or cream compounded in this manner and in which the active element is sodium chloride in hypertonic concentration, when applied to the skin conditions and the skin especially on cutaneous wounds, produces an exosmotic effect on the underlying tissues, that is, an osmotic action directed from the interior to the exterior of the tissue. This exosmosis produces an aspiration of the tissue liquids. This effect is due to the salt of the paste being in hypertonic concentration, or in other words, having a higher proportion of ions per unit of volume than the blood.

It should be noted that the effects described above are attributed to the sodium chloride since it is this salt which is essentially contained in the blood serum and in the liquid surrounding the cellular tissues. The soothing effect produced by it could not have been obtained with another salt, for example with potassium chloride which is contained in the body cells themselves but not in the surrounding liquid. Whereas an application of potassium chloride on the skin would produce a painful effect, sodium chloride has a soothing action.

Best effects are obtained with sodium chloride in its usual and common form of marine salt which because of its complex composition furnishes a solution containing not only sodium chloride, the essential active element, but also other compounds in biological equilibrium with blood serum.

It is advantageous, furthermore, to incorporate into the paste or cream composed of a solution of sodium chloride supported by an absorbent medium, as stated above, an emulsifying agent and/or fatty elements. Such additions contribute to the stability of the paste and give it the desired texture.

As emulsifying agents can be used emulsifiers of the type oil in water, or water in oil. Such agents can be used as mixtures of high fatty alcohols with fatty alcohol sulfates, preferably in the proportion of one part of sulfate to nine parts of alcohol. In particular, cetylstearyl alcohol can be used to which sodium cetylstearyl sulfate has been added. Lanolin can also be added to the paste, as well as certain fatty alcohols such as wool fat alcohols, or mixtures of these with vaseline, cholesterol, and its ester in petroleum jelly sold under the trademark Vaseline. Moisture conserving agents may also be added, such as polyoxyethyleneglycols of a mean molecular weight (400 to 4000), glycerine, sorbitol, 1,2-propylene glycol, singly or in mixture.

Preservatives may also be added to the paste, such as p-hydroxybenzoic esters, sorbic acid, phenylmercury compounds, or such bacteriostatic compounds as benzyl or phenylethyl alcohol, singly or mixed. Antiseptics and/or antibiotics can also be introduced into the paste.

Finally, coloring agents may be added to the paste or cream, especially those with skin color. These colorants can be pigments, iron oxides or lacs, or water soluble products.

With these additions, the composition of the paste follows:

Marine salt: 10 to 15%, preferably 15%
Colloidal silical, Aerosil): 1 to 10%, preferably 3 to 8%
Emulsifier: 5 to 15%, preferably 8 to 12%
Lanolin or similar fatty agent: 1 to 3%
Moisturizers: 5 to 20%
Preservatives: Trace
Colorants: Trace
Perfume: Trace
Water: q.s. to 100%

The composition is prepared by starting with an aqueous solution of marine salt and the other water-soluble substances. Into this solution, the colloidal silica is dispersed. Then, gently heating the mixture, the fatty and other substances are added.

In this manner an oily cream is produced which constitutes an emulsion of the type oil in water and which is easily spread on the skin. Such application produces a soothing effect on the skin.

The high water content produces a refreshing effect through evaporation. The presence of the hygroscopic fatty substances prevents a too rapid drying which would promote crystallization of the salt and would be detrimental to the exosmotic effect. The lanolin has a greasing effect which prevents desiccation and fissurization of the skin; it produces a mollifying sensation.

The colloidal silica which holds the salt solution has, when the cream is applied to the skin, the effect of absorbing exudate. The lanolin assures the maintenance of the consistency of the cream in emulsion form. The fatty elements, glycerine or others, promote maintenance of moisture in that they maintain the state of salt solution.

The emulsifying agent with a base of cetylstearyl alcohol has the advantage of permitting the skin to be washed with clear water despite the presence of the fatty substances which is of particular advantage for patients who are allergic to soap or in applications near wounds or inflammations.

Examples of compositions:

PREPARATIVE EXAMPLE I

| | G. |
|---|---|
| Kitchen salt | 15.0 |
| Colloidal silica (Aerosil) | 4.0 |
| Cetylstearyl alcohol | 9.0 |
| Lanolin | 2.5 |
| Polyoxyethylene glycol 2000 | 10.0 |
| Sodium cetylstearyl sulfate | 1.0 |
| p-Hydroxybenzoic acid, methyl ester | 0.07 |
| p-Hydroxybenzoic acid, propyl ester | 0.03 |
| Iron oxide | 0.2 |
| Water to 100.0 g. | |

PREPARATIVE EXAMPLE II

| | G. |
|---|---|
| Kitchen salt | 10.0 |
| Colloidal silica (Aerosil) | 6.0 |
| Stearyl alcohol | 7.0 |
| Sodium lauryl sulfate | 1.0 |
| Wool fat alcohol | 0.2 |
| Vaseline | 2.0 |
| Glycerine | 5.0 |
| Polyoxyethylene glycol 4000 | 5.0 |
| Sorbic acid | 0.2 |
| Water to 100.0 g. | |

PREPARATIVE EXAMPLE III

| | G. |
|---|---|
| Marine salt | 15.0 |
| Colloidal silica (Aerosil) | 5.0 |
| Cetylstearyl alcohol | 9.0 |
| Lanolin | 3.0 |
| Polyoxyethylene glycol 1500 | 8.0 |
| Sorbitol (70%) | 2.0 |
| Phenylmercuric nitrate | 0.002 |
| Water-soluble color | — |
| Perfume | 0.0 |
| Water to 100.0 g. | |

PREPARATIVE EXAMPLE IV

| | G. |
|---|---|
| Marine salt | 15.0 |
| Colloidal silica (Aerosil) | 9.0 |
| Cetylstearyl alcohol | 10.0 |
| Sodium lauryl sulfate | 1.0 |
| Lanolin | 2.0 |
| Polyoxyethylene glycol 1000 | 5.0 |
| 1,2-propylene glycol | 5.0 |
| p-Hydroxybenzoic acid, methyl ester | 0.08 |
| p-Hydroxybenzoic acid, propyl ester | 0.02 |
| Perfume | 0.1 |
| Water to 100.0 g. | |

EXAMPLE I

When used for cosmetic purposes, the paste or cream made as described above can be used as a beauty cream, e.g., the paste or cream is applied to the skin in the evening prior to retiring. Repeated applications of the paste or cream results in a smoothing of the skin.

I claim:
1. A process for providing a soothing effect on skin which comprises applying to the skin a cream consisting essentially of:

| | Percent |
|---|---|
| Sodium chloride | 10–15 |
| Colloidal silica | 1–10 |
| A member selected from the group consisting of stearyl alcohol and cetostearyl alcohol | 5–15 |
| Lanolin | 1–3 |
| A member selected from the group consisting of glycerol and polyethylene glycol of molecular weight 400–4000 | 1–20 |
| Color | Trace |
| Water q.s. to 100%. | |

References Cited

Martin et al., Remington's Practice of Pharmacy, 12th edit.; 1961, pp. 412–418 RS91R36.

Pharmaceutical Formulas 1944, vol. 1, pp. 507, 504, 1026 and 1027.

Manufacturing Chemist., April 1960, p. A84.

Sagarin Science of Cosmetics and Technology, 1957, pp. 1005.

ALBERT T. MEYERS, Primary Examiner

D. R. ORE, Assistant Examiner

U.S. Cl. X.R.
424—168